United States Patent
Hope

(10) Patent No.: US 8,191,942 B2
(45) Date of Patent: Jun. 5, 2012

(54) BUMPER FOR A MOTOR VEHICLE

(75) Inventor: James Hope, Frankfurt am Main (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 12/899,320

(22) Filed: Oct. 6, 2010

(65) Prior Publication Data

US 2011/0133499 A1 Jun. 9, 2011

(30) Foreign Application Priority Data

Oct. 6, 2009 (DE) .................. 10 2009 048 336

(51) Int. Cl.
 *B60R 19/02* (2006.01)
(52) U.S. Cl. .............. 293/120; 296/187.04; 362/505
(58) Field of Classification Search .......... 293/102, 293/120–122; 362/505; 296/187.04
See application file for complete search history.

(56) References Cited

U.S. PATENT DOCUMENTS

| | | | | |
|---|---|---|---|---|
| 2,138,082 | A * | 11/1938 | Worden | 362/507 |
| 3,814,461 | A * | 6/1974 | Rhody | 410/108 |
| 6,361,197 | B1 * | 3/2002 | Katsumata et al. | 362/546 |
| 2007/0194892 | A1 | 8/2007 | Schaaf et al. | |
| 2007/0230273 | A1 | 10/2007 | Nakajima et al. | |
| 2008/0087744 | A1 | 4/2008 | Baba | |
| 2009/0039618 | A1 | 2/2009 | Takemura | |
| 2009/0115205 | A1 * | 5/2009 | Steller et al. | 293/115 |

FOREIGN PATENT DOCUMENTS

| | | |
|---|---|---|
| DE | 4320975 A1 | 1/1995 |
| DE | 10239452 A1 | 3/2004 |
| DE | 102004022835 A1 | 12/2005 |
| EP | 0611682 A1 | 8/1994 |
| EP | 0969171 A2 | 1/2000 |
| EP | 1659033 A2 | 5/2006 |
| EP | 1911642 A2 | 4/2008 |
| JP | 2000095024 A | 4/2000 |
| JP | 2004306888 A | 11/2004 |

OTHER PUBLICATIONS

British Patent Office, British Search Report for British Application No. 1014932.6, Dec. 15, 2010.
German Patent Office, German Search Report for German Application No. 102009048336.5, Jul. 22, 2010.

* cited by examiner

*Primary Examiner* — Dennis Pedder
(74) *Attorney, Agent, or Firm* — Ingrassia Fisher & Lorenz, P.C.

(57) ABSTRACT

A bumper for a motor vehicle includes, but is not limited to a bumper shell having an outer surface and a cut-out opening. A cut edge of the opening meets the outer surface at a sharp edge. A frame inserted into the opening covers the cut edge and an exposed outer surface of the frame has a convex curvature with a curvature radius of at least approximately 2 mm.

13 Claims, 2 Drawing Sheets

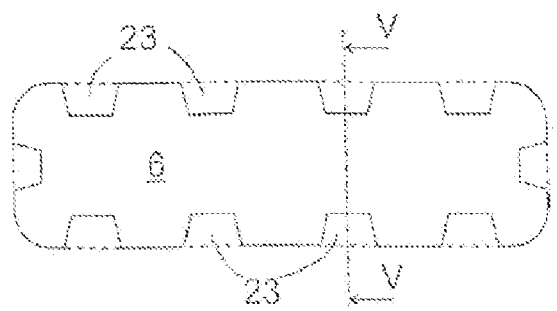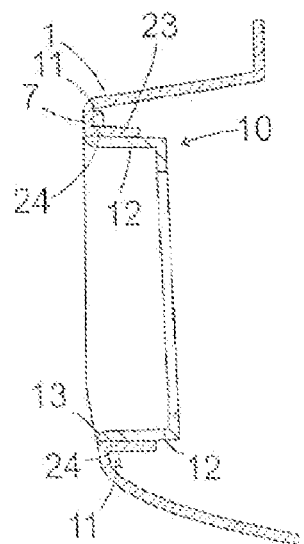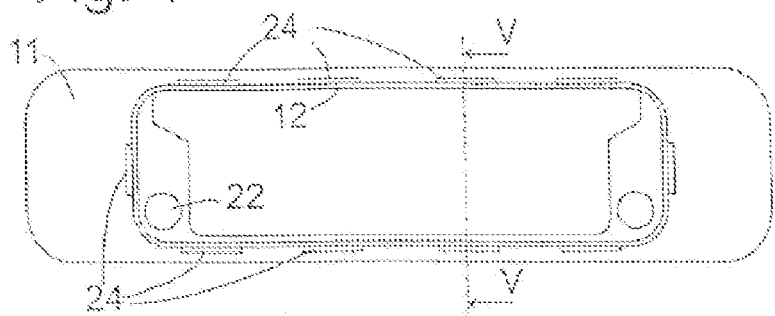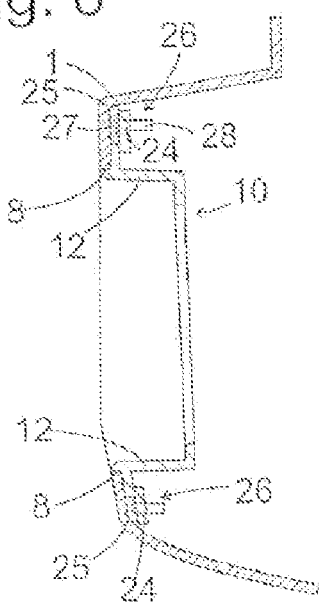

BUMPER FOR A MOTOR VEHICLE

CROSS-REFERENCE TO RELATED APPLICATION

This application claims priority to German Patent Application No. 102009048336.5, filed Oct. 6, 2009, which is incorporated herein by reference in its entirety.

TECHNICAL FIELD

The present invention relates to a bumper, more preferably a rear bumper for a motor vehicle.

BACKGROUND

The bumpers of modern motor vehicles mostly comprise a large-area bumper shell that forms a part of the visible outer skin of the vehicle. On the one hand it is designed in order to absorb and yield backwards subject to minor energy absorption, on the other hand it covers parts of the bumper such as a cross member which are able to deform subject to the absorption of large amounts of energy.

It is desirable that the bumper does not have any unnecessarily sharp exposed edges. A motor vehicle in Europe can therefore only be approved for road traffic if it does not have any edges with a curvature radius of less than 2.5 mm which could come in contact with a test body of 100 mm diameter impacting the body. In order to satisfy this requirement, openings of the bumper shell which for instance are required for the installation of headlamps are usually not simply punched out of the bumper shell but comprise a short socket extending all around the opening and engaging into the vehicle interior which socket via a continuous curvature merges with the outer surface of the bumper shell. During the molding of the bumper shell, this curvature can be easily created with the necessary radius but requires adapted tooling in each case.

An opening, which is only present in a part of the bumpers of a series, increases the cost of production substantially since separate sets of molding tools for the production of bumper shells with and without opening are required. In order to avoid these costs the applicant has developed a bumper wherein an opening of the bumper shell through which a load carrier, more preferably a bicycle carrier, can be pulled out of the body, is subsequently cut into a finished molded bumper shell. Although through the subsequent cutting of the opening a sharp edge, at which a cut edge of the opening meets the outer surface of the bumper, is created, this does not however create any licensing problems since the opening is formed in a depression of the bumper that also accommodates the license plate so that the sharp edge is not accessible to the above-mentioned test body. If however the opening can only be formed in a depression of the bumper shell this results in substantial restrictions in the design freedom of the body.

Therefore, there is at least a need for a bumper for a motor vehicle which despite an opening cut out with a sharp edge can be licensable without the opening on the bumper shell having to be arranged in a depressed manner. In addition, other needs, desirable features and characteristics will become apparent from the subsequent summary and detailed description, and the appended claims, taken in conjunction with the accompanying drawings and this background.

SUMMARY

A bumper for a motor vehicle is provided with a bumper shell having an outer surface and a cut-out opening, wherein a cut edge of the opening meets a sharp edge on the outer surface, a frame inserted in the opening covers the cut edge and a freely exposed outer surface of the frame comprises a convex curvature with a curvature radius of at least 2 mm. Here it is thus not the recessed arrangement of the opening that prevents the contact of the test body with the sharp edge but the frame inserted in the opening.

According to one embodiment, the freely exposed outer surface of the frame joins the outer surface of the bumper shell in a flush manner (See FIG. 2); alternatively it is also possible that the frame protrudes over the outer surface of the bumper shell. Any sharp curvature in the common outer surface of the bumper shell and the frame at the transition between the two possibly resulting from this protrusion does not impair the licensability of a vehicle equipped with the bumper according to the invention, since this curvature is concave and it cannot be entered by a test body.

While the bumper shell can be cost-effectively deep drawn in the usual manner known per se the frame is preferentially injection molded. Since the dimensions of the frame in general are significantly smaller than those of the bumper shell, the costs involved in the provision of molding tools for the frame as a rule are substantially lower than the costs of a second set of molding tools for a complete bumper shell, even if the first are injection molding tools and the latter deep drawing tools.

In order to anchor the frame on the bumper over a large area that can be subjected to load the frame is preferentially provided with a leg bearing against an inner surface of the bumper shell. This leg is preferentially welded to the inner surface of the bumper shell, more preferably ultrasound-welded or glued.

In order to exactly determine the position of the frame on the bumper shell despite possible manufacturing tolerances and more preferably to guarantee a small gap width between the cut edge and the part of the frame covering it, openings can be provided on the leg that are penetrated by protrusions of the bumper shell. Such protrusions can be joined to the bumper shell but these can also be lugs of the bumper shell obtained when cutting the opening of the bumper shell and angled-off into the interior of the body.

The bumper shell at least on its outer surface is usually provided with a coat of paint in order to lend it a uniform appearance with adjoining body panels. The cut edge is preferentially free of the paint layer. Such a bumper shell can be practically obtained in that the opening is cut after the painting. This has advantages in terms of manufacturing logistics since for the production of different vehicle types painted bumper shells with and without opening need not be stocked separately.

The frame, too, preferentially has a paint layer at least on its outer surface so that on the finish assembled vehicle it is not conspicuous as an element separate from the bumper shell. By painting bumper shells and frames with paint of a same batch, deviations in shades of color between both can be easily avoided.

In that the bumper shells and frames are painted separately, separate paint layers are obtained on both and there is no risk of tearing open of a continuous paint layer at a joint between bumper shell and frame.

Preferentially, a movable lid is arranged in the opening in order to conceal an equipment part extendable through the opening when not in use. A stop defining a position of the lid that is flush with the outer surface of the bumper shell can be formed on the frame. The equipment part preferentially is a load carrier, more preferably for bicycles.

For the case that a license plate is mounted to the bumper or another part of the motor vehicle body above the opening so that it can be obscured by a load placed on the load carrier, an additional license plate is practically extendable with the load carrier from the opening.

BRIEF DESCRIPTION OF THE DRAWINGS

The present invention will hereinafter be described in conjunction with the following drawing figures, wherein like numerals denote like elements, and:

FIG. 3 an opening punched into the bumper shell;

FIG. 4 a front view of a frame provided for attachment of the opening in FIG. 3;

FIG. 5 a section through the bumper shell and the frame of FIG. 3 and FIG. 4 respectively in the assembled state; and FIG. 6 a section analog to FIG. 5 according to a third configuration of the invention.

DETAILED DESCRIPTION

The following detailed description is merely exemplary in nature and is not intended to limit application and uses. Furthermore, there is no intention to be bound by any theory presented in the preceding background or summary \or the following detailed description.

Figure 1:
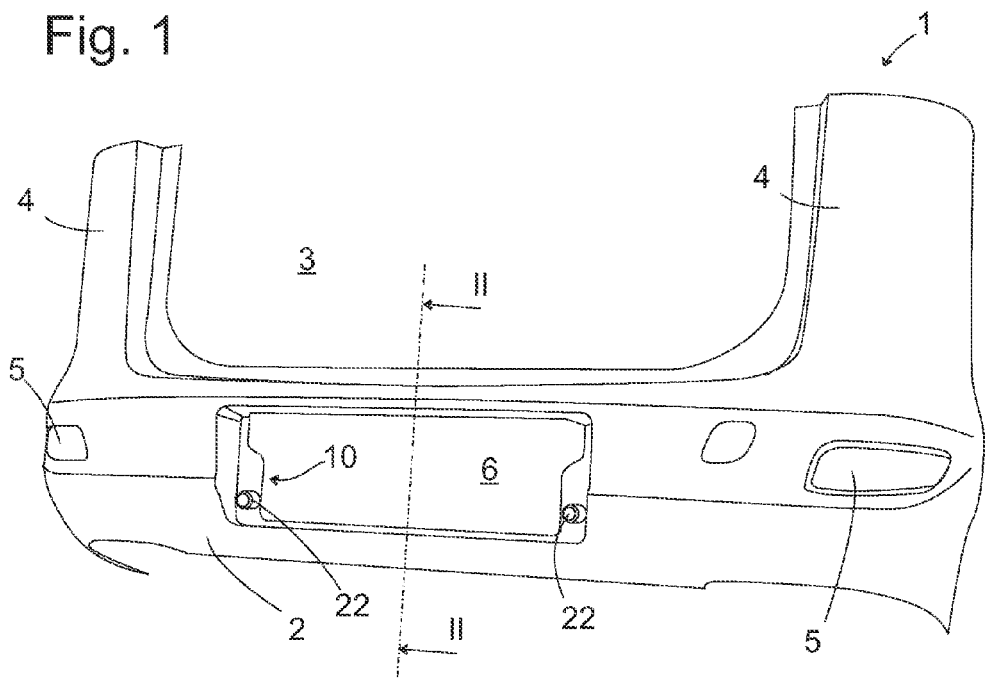
FIG. 1 a schematic perspective view of a bumper shell according to the invention.

FIG. 1 shows a bumper shell 1 for the tail area of a motor vehicle in a schematic perspective view. The bumper shell 1 is unitarily deep drawn from plastic. It comprises a horizontal center piece 2 which extends over the entire width of the vehicle body and two arms 4 extending upwards from the ends of the center piece on both sides of a tail gate clearance 3 covering vertical edges of the tail of the body.

In a transition region between the center piece 2 and the arms 4, openings 5 for rear fog lamps are provided. These openings 5 are obtained through pressing-in a depression in the flat material of the bumper shell 1 during the deep drawing and punching-out of a bottom of the depression and are thus each surrounded by a short socket reaching into the interior of the body, whose inner surface via an evenly curved edge region merges with the outer surface of the bumper shell 1. The curvature of this edge region is predetermined through the shape of the molding tools used for deep drawing and can typically amount to about 5 to 6 mm.

Figure 2:
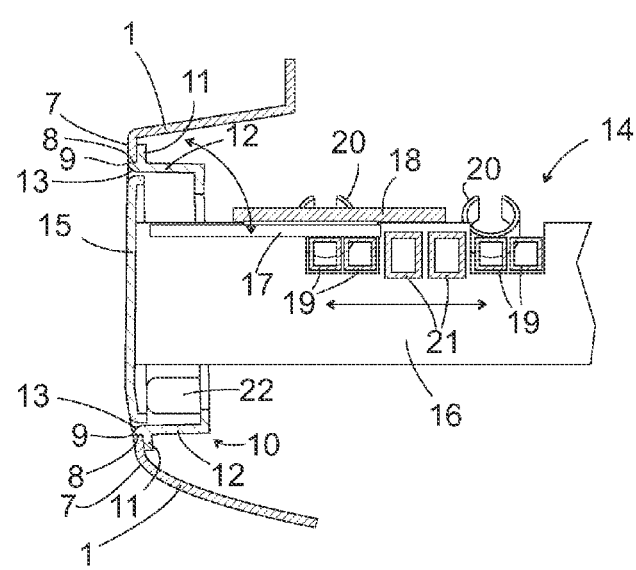
FIG. 2 a section through the bumper according to the invention in vehicle longitudinal direction along the line designated II-II in FIG. 1.

A large-area opening 6 in a central region of the centerpiece 2 is provided in order to extend through it a bicycle carrier lowered into the body when not in use, as still described in more detail by means of FIG. 2. Since such a bicycle carrier is not available as standard with all vehicles of a same type but is ordered by the customer if required, the opening 6 is only required with a part of the bumper shells of a given vehicle type. In order to be able to deep draw the bumper shells with and without the opening 6 with a same set of tools it is therefore practical to subsequently produce the opening 6 in the deep drawn bumper shell 1, more preferably through punching out. As is evident in the section of FIG. 2, cut edges 8 substantially orientated at a right angle to the outer surface 7 of the bumper shell 1 are created which, where these meet with the outer surface 7, form a sharp edge 9.

Since the edge 9 is not located in a depression of the bumper shell 1 - a depression accommodating a license plate can for example be provided on the tailgate of the vehicle which is not shown - contact of the edge 9 with a test body striking it is not excluded if no suitable countermeasures are taken. These countermeasures consist of a square frame 10 unitarily injection molded and inserted into the opening 6 whose four sides each comprise a leg 11 bearing against an inner surface of the bumper shell 1 and fastened to this inner surface through gluing or welding, more preferably ultrasonic welding and a second leg 12 crossing this first leg 11 substantially at a right angle, wherein a section of the leg 12 protruding over the leg 11 which conceals the cut edges 8 comprises an outer surface 13 which at the edge 9 joins the outer surface 7 of the bumper shell 1 in a flush manner. An evenly curved section of this outer surface 13 has a curvature radius of 2.5 mm or more. Thus, contact of the test body with surface regions having a smaller curvature radius than about 2.5 mm is excluded.

A bicycle carrier 14 extendable through the opening 6 is shown in the sunk position in FIG. 2 in which a lid 15 of the bicycle carrier 14 closes the opening 6 substantially flush with the outer surface 7. The lid 15 is held by two longitudinal members 16 movable in vehicle longitudinal direction which are arranged on both sides of the cutting plane of FIG. 2. Buffers 24 fastened to the frame 10 form a stop for the lid 15 in the sunken position. A holder 17 with a license plate 18 fastened thereto is pivotably fastened to an outer end of the two members 16 so that when the bicycle carrier 14 is extended from the opening 6 it can be folded into an upright position in which the license plate 18 as substitute for the license plate of the tailgate possibly obscured by the bicycles mounted on the bicycle carrier 14 is visible.

On the longitudinal members 16 several pairs of cross members 19 are displaceably mounted in vehicle transverse direction. Each cross member 19 carries a clamp 20 on a longitudinal end each for gripping a front or rear wheel of a bicycle. The cross members 19 are adjustable in vehicle transverse direction between a pushed-together position in which they fit through the opening 6 and a pulled-apart position in which they laterally extend in front of the centerpiece 2 beyond the opening 6. Between two pairs of cross members 19 pillars 21 are accommodated which in the extended position of the vehicle carrier 14 can be pivoted into an upright position about axes oriented in vehicle longitudinal direction, in which position the frame of a bicycle held in the clamps 20 of the cross members 19 can be fixed in each case.

The bumper shell 1 and the frame 10 are each painted in the same shade of color separately from each other, so that in the finished joined state it is not conspicuous that these are two separate parts. On the bumper shell 1 the paint layer is only applied to the outer surface 7 before the punching out of the opening 6; on the frame 10 at least the surface of the leg 11 facing the bumper shell 1 is cleared from the paint layer so as not to hinder the welding of the frame 10 to the bumper shell 1.

Manufacturing tolerances during deep drawing of the bumper shell 1 or during punching out of its opening 6 or during the injection molding of the frame 10 can result in that between the cut edges 8 and the leg 12 of the frame 10 a gap remains open. In order to prevent this or in order to guarantee a uniform width of this gap over its entire length, it is proposed according to a second configuration of the invention to punch out the opening 6 in the form shown in FIG. 3 with straps 23 protruding into the interior, wherein the straps 23 in a further processing step following the punching or preferentially through the punching tool itself are bent off at a right angle into the interior of the bumper shell 1. Matching the straps 23, slits 24 are formed in the leg 11 of the frame 10 directly adjoining the protruding leg 12, as is shown in the front view of FIG. 4. By inserting the straps 23 into the slits 24 during the installation of the frame a uniform small gap width all around the opening 6 can be ensured. FIG. 5 shows a section through the bumper shell 1 and the frame 10 along the plane designated V-V in FIGS. 3 and 4 each, in which the engagement of the straps 23 in the slits 24 is shown.

FIG. 6 shows a modification of the principle described with reference to FIG. 3 to FIG. 5 according to which on the bumper shell 1 during the punching-out of the opening 6 instead of the straps 23 non-visible reference marks 25 are formed on the outer surface 7. These reference marks formed with minimum tolerance relative to the cut edges 8 define the locations on the inner surface of the bumper shell 1 in which in a subsequent production step molded bodies 26 are fastened each of which molded bodies comprises a foot 27 bearing against the inner surface of the bumper shell 1 in a flat manner and at least one strap 28 standing away. The frame 10 in turn is provided with slits 24 which are so placed on the leg 11 that when these accommodate the straps 27 the cut edges 8 immediately bear against the legs 12 of the frame 10. Thus, the gap width between the legs 12 and the cut edges 8 can be reduced to a minimum.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A bumper for a motor vehicle, comprising:
   a bumper shell comprising a substantially flat planar section having an outer surface and an inner surface and a cut-out opening extending therethrough and defining a cut inner perimeter edge;
   said cut inner perimeter edge of the cut-out opening extending from said outer surface to said inner surface of said substantially flat planar section and characterized by a sharp edge extending along said inner perimeter edge and defining a line at which said cut inner perimeter edge meets said outer surface of said substantially flat planar section; and
   a frame inserted into the cut-out opening, said frame comprising an outer perimeter shape corresponding to and configured to mate with said cut inner perimeter edge and which substantially covers the cut edge, said frame further comprising, in cross section, a first leg and a substantially orthogonal second leg defining a corner therebetween, where said first leg meets said second leg, and further wherein said first leg comprises a flat surface bearing against and mating with said inner surface of said flat planar section proximate said cut inner perimeter;
   wherein said second leg comprises a flat surface bearing against said cut edge and further comprising an exposed outer surface of the frame exhibiting a convex curvature with a curvature radius of at least approximately 2 mm; and
   wherein the exposed outer surface of the frame follows the outer surface of the bumper shell in a substantially flush manner.

2. The bumper according to claim 1, wherein the frame is injection molded and the bumper shell is deep drawn.

3. The bumper according to claim 1, wherein the first leg is permanently affixed to said inner surface of the bumper shell.

4. The bumper according to claim 3, wherein said first leg is glued to said inner surface.

5. The bumper according to claim 3, wherein said first leg is welded to the inner surface.

6. The bumper according to claim 3, wherein said first leg comprises openings penetrated by protrusions of the bumper shell.

7. The bumper according to claim 1, wherein the outer surface of the bumper shell comprises a paint layer and the cut edge is substantially clear of the paint layer.

8. The bumper according to claim 1, wherein the frame comprises a paint layer at least on a frame outer surface.

9. The bumper according to claim 1, wherein the bumper shell has a first paint layer that is separate from a second paint layer of the frame.

10. The bumper according to claim 1, further comprising a movable lid arranged in the cut-out opening.

11. The bumper according to claim 10, further comprising a stop defining a position of the movable lid that is substantially flush with the outer surface of the bumper shell is formed on the frame.

12. The bumper according to claim 1, wherein a load carrier is extendable from the cut-out opening.

13. The bumper according to claim 12, wherein a license plate can be extended with the load carrier from the cut-out opening.

* * * * *